United States Patent
Athsani et al.

(10) Patent No.: US 8,725,490 B2
(45) Date of Patent: May 13, 2014

(54) VIRTUAL UNIVERSAL TRANSLATOR FOR A MOBILE DEVICE WITH A CAMERA

(75) Inventors: Athellina R. Ahmad Athsani, San Jose, CA (US); Chris T. Kalaboukis, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1620 days.

(21) Appl. No.: 11/874,421

(22) Filed: Oct. 18, 2007

(65) Prior Publication Data

US 2009/0106016 A1    Apr. 23, 2009

(51) Int. Cl.
*G06F 17/28*    (2006.01)

(52) U.S. Cl.
CPC ..................................... *G06F 17/289* (2013.01)
USPC ....................................... 704/2; 703/3; 703/8

(58) Field of Classification Search
CPC .............................. G06F 17/28; G06F 17/289
USPC ....................................................... 704/2, 3, 4
See application file for complete search history.

(56) References Cited

U.S. PATENT DOCUMENTS

| 6,085,112 | A  | * | 7/2000  | Kleinschmidt et al. .... 455/556.1 |
| 6,219,646 | B1 | * | 4/2001  | Cherny ........................... 704/277 |
| 6,473,523 | B1 | * | 10/2002 | Newman et al. ............... 382/176 |
| 7,091,989 | B2 |   | 8/2006  | Gibbs et al. |
| 7,653,528 | B2 | * | 1/2010  | Kohlmeier et al. ................ 704/8 |
| 2001/0032070 | A1 | * | 10/2001 | Teicher ............................. 704/2 |
| 2001/0047255 | A1 | * | 11/2001 | Fuji ................................. 704/10 |
| 2001/0056342 | A1 | * | 12/2001 | Piehn et al. ......................... 704/3 |
| 2002/0085111 | A1 | * | 7/2002  | Heiman .................... 348/333.01 |
| 2003/0065768 | A1 |   | 4/2003  | Malik |
| 2003/0095681 | A1 |   | 5/2003  | Burg et al. |
| 2003/0120478 | A1 | * | 6/2003  | Palmquist .......................... 704/3 |
| 2003/0164819 | A1 | * | 9/2003  | Waibel ........................... 345/173 |
| 2003/0200078 | A1 | * | 10/2003 | Luo et al. .......................... 704/2 |
| 2004/0041925 | A1 | * | 3/2004  | Shibutani ...................... 348/239 |
| 2006/0053001 | A1 | * | 3/2006  | Brockett et al. ................... 704/9 |
| 2006/0224378 | A1 | * | 10/2006 | Chino et al. ....................... 704/2 |
| 2006/0271349 | A1 | * | 11/2006 | Scanlan ............................ 704/2 |

OTHER PUBLICATIONS

Mediaseek releases "Camera Dictionary" the application that translates English words by simply scanning the mobiles' camera over words. http://wwww.slashphone.com/64/51775.html, printed Oct. 4, 2007 (3 pages).

Derbyshire, D. "Phones or iPod a thing of the past," http/www.dailymail.co.uk/pages/live/articles/news/news. Html?in_article_id-533358&in_. . . printed Mar. 21, 2008 (pp. 3-11).

(Continued)

*Primary Examiner* — Jialong He
(74) *Attorney, Agent, or Firm* — Weaver Austin Villeneuve & Sampson LLP

(57) ABSTRACT

Disclosed are apparatus and methods for providing a virtual universal translator (VUT) for a mobile device so that a user of such mobile device can use the camera and display of the mobile device to translate text from one language to another language. As the user points the mobile device's camera at a particular text string, such text string is automatically translated by the VUT into a different language that was selected by the user and this translated text is then transposed over the currently viewed image or video in the display of the mobile device. The user can utilize the VUT to continuously pass the camera over additional text strings so that the translated text displayed over the viewed image or video is continuously updated for each new text string.

21 Claims, 7 Drawing Sheets

(56) References Cited

OTHER PUBLICATIONS

Future of Internet Search: Mobile version, http://petitinvention.wordpress.com/2008/02/10/future-of-interest-search-mobile-version/ printed Mar. 21, 2008 (pp. 1-19).

Google Mobile—SMS http://www.google.com/intl/en_us/mobile/default/sms.html, printed Feb. 4, 2009 (2 pages).

Yahoo! Babel Fish—Text Translation and Web Page Translation, http://babelfish.yahoo.com/, printed Feb. 4, 2009.

Attributor: Overview—Monitor your content and improve your content syndication, http://www.attributor.com/how_it_works/overview.php, printed Feb. 4, 2009 (12 pages).

Google, Neven Vision & Image Recognition, Search Engine Journal, http://www.searchenginejournal.com/google-neven-vision-image-recognition/3728/#more-3728, printed Feb. 4, 2009.

Downloads—pgp.comFree PGP Encryption Platform Evaluation—Download PGP Univers . . . http://www.pgp.com/downloads/destoptrial/index.html printed Feb. 4, 2009 (1 page).

PGP Whole Disk Encryption—Comprehensive Hard Drive Encryption for PC's, Laptops and . . . http://www.pgp.com/products/wholediskencryption/index.html, printed Feb. 4, 2009, (2 pages).

Callas J., et al. Open PGP Message Format; http://www.ietf.org/rfc/rfc2440.txt, Request for Comments 2440, International Engineering Task Force, Nov. 1998.

\* cited by examiner

VIRTUAL UNIVERSAL TRANSLATOR FOR A MOBILE DEVICE WITH A CAMERA

BACKGROUND OF THE INVENTION

The field of the present invention relates generally to language translation. More particularly, it relates to use of a camera of a mobile device to provide language translation.

The use of mobile devices, such as cellular phones, portable gaming consoles, or personal digital assistant (PDA) devices, has increased dramatically in the last decade. Often, such mobile devices include a camera and display for displaying images at which the camera is pointed. Since people usually carry their camera-capable mobile devices with them to a number of settings, it would be beneficial to provide additional mobile applications for utilizing the camera and display capabilities of such prevalent mobile devices.

SUMMARY OF THE INVENTION

In embodiments of the present invention, a virtual universal translator (VUT) is provided for a mobile device so that a user of such mobile device can use the camera and display of the mobile device to translate text from one language to another language. As the user points the mobile device's camera at a particular text string, such text string is automatically translated by the VUT into a different language that was selected by the user and this translated text is then transposed over the currently viewed image/video in the display of the mobile device. The user can utilize the VUT to continuously pass the camera over additional text strings so that the translated text displayed over the viewed image/video is continuously updated for each new text string.

In one embodiment, a method of translating text using a mobile device is disclosed. When a camera of the mobile device is pointed at a first text string in a first language, an image/video of the first text string in the first language is presented in a display of the mobile device. When a translation option is selected on the mobile device and the first text string is displayed in the first language on the display, a translation is obtained of the first text string into a second text string in a second language that has been associated with the user of the mobile device or the mobile device. After a translation of the first text string into a second text string in a second language is obtained, the translation result is transposed over the image/video captured by the camera.

In a specific implementation, the second language is associated with the user when the user has selected the second language as a language preference and the first language is automatically determined without user input prior to obtaining the translation. In another aspect, contextual information associated with the first or second text string is obtained. This contextual information is displayed in the display of the mobile device. In yet another aspect, each time the camera is pointed at a new text string, the operations for obtaining a translation and displaying a result of such translation are automatically repeated for such new string.

In another embodiment, a pronunciation of the first and/or second string is output from an audio device of the mobile device. In another feature, the first language is a first reading level and the second language is a second reading level differing from the first reading level. In another feature, the first language is a first regional, cultural, or political dialect and the second language is a second regional, cultural, or political dialect differing from the first dialect. In yet another feature, certain predefined words are filtered from the second text before displaying such second text.

In an alternative embodiment, a method of providing text translation for a mobile device is disclosed. When the mobile device is registered for a translation service and an image/video having a first text string in a first language is received from such mobile device, a translation is obtained of the first text string into a second text string in a second language that has been associated with the user of the mobile device or the mobile device. After a translation of the first text string into a second text string in a second language is obtained, the second text string in the second language is sent to the mobile device so that the second text string is to be transposed over the image/video captured by the camera and presented in the display of the mobile device.

In a specific implementation, the second language is associated with the user when the user has selected the second language as a language preference and the first language is automatically determined without user input prior to obtaining the translation. In another aspect, certain predefined words are filtered from the second text string, and the filtered second text string is sent to the mobile device. In another features, the first language is a first reading level or a first regional, cultural, or political dialect and the second language is a second reading level differing from the first reading level or a second regional, cultural, or political dialect differing from the first dialect.

In another embodiment, the invention pertains to a mobile device having a camera for capturing images/video and a display for displaying the captured images/video. The mobile device further includes processor and a memory that is configured to perform one or more of the above described operations. In another embodiment, the invention pertains to a system having a processor and memory that are configured to perform one or more of the above described operations. In another embodiment, the invention pertains to at least one computer readable storage medium having computer program instructions stored thereon that are arranged to perform one or more of the above described operations.

These and other features will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

People encounter foreign languages that they are not able to understand while traveling to various locations. By way of a few examples, people may encounter numerous signs that are depicted in a foreign language at transportation locations, such as bus or train stations or airports, on or in buildings to indicate various information, as street designations, etc. Although users can use language translation applications on their mobile devices by keying in text into the translation application, this type of translation technique is limited by what the user can type into the mobile application. In general, embodiments of the present invention provide a Virtual Universal Translator (VUT) that resolves this issue by allowing mobile device users to use camera-capable mobile devices by pointing the device's camera to text so as to get instantaneous translation of such text into text or voice. The translated text is presented in the display on the mobile device so that the translated text is transposed over the image/video that is captured by the camera. Since the display on most mobile devices is opposite the camera lens side, the user can pass his/her camera over different text strings that he/she may encounter and look in the display to view the translated text that is automatically transposed over each image/video that is captured in the display.

Figure 1:
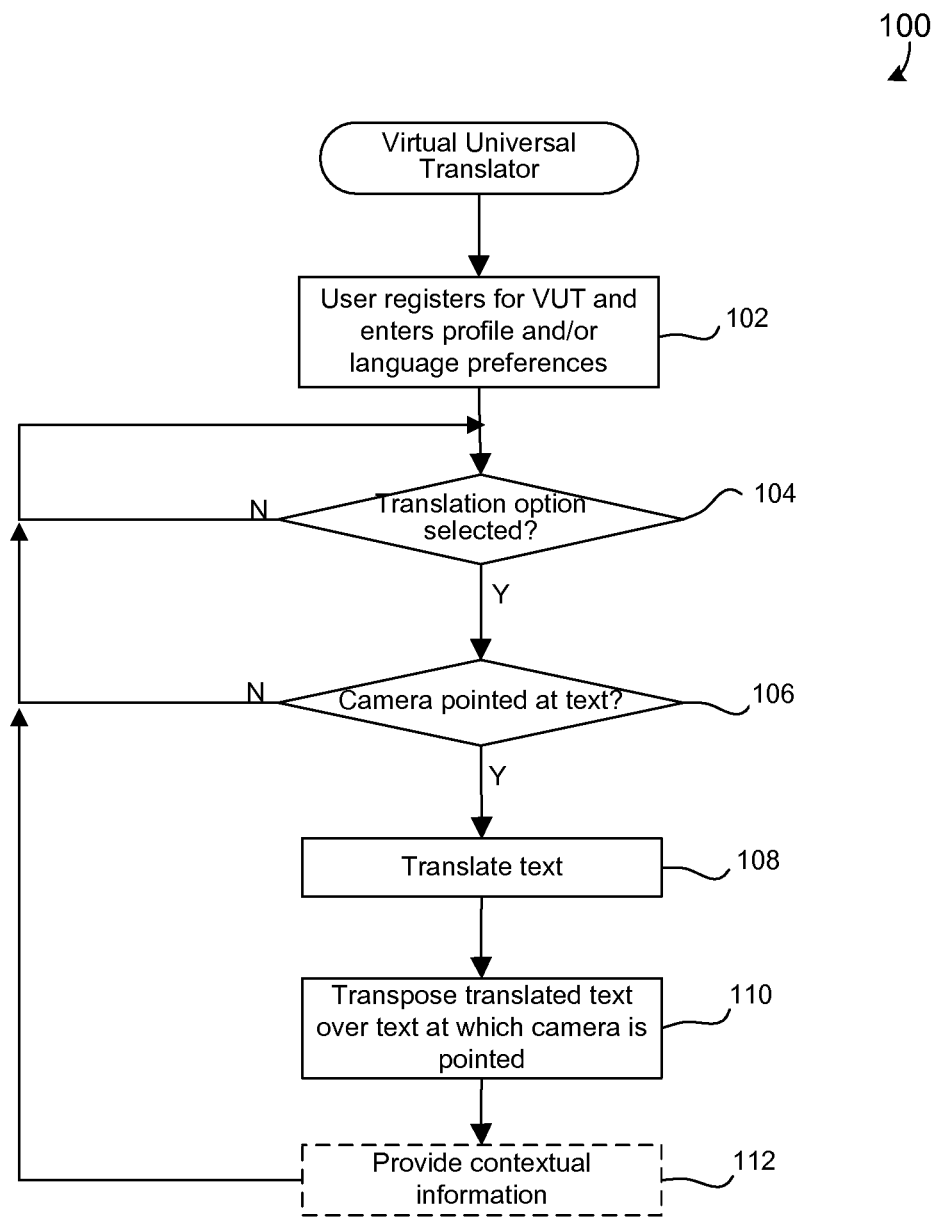
FIG. 1 is a flowchart illustrating a procedure for virtual universal translation (VUT) in accordance with one embodiment of the present invention.

FIG. 1 is a flowchart illustrating a procedure 100 for virtual universal translation (VUT) in accordance with one embodiment of the present invention. The VUT procedure 100 of FIG. 1 is described below with respect to a single user on a single mobile phone. Of course, this VUT procedure may be implemented with respect to any number of mobile devices and users in a diverse cellular and/or computer network as described further below. A mobile device may include any device that is portable and may include, by way of examples, cellular phones, portable gaming consoles, or personal digital assistant (PDA) devices, etc.

Initially, a user may register for a VUT application and enter profile and/or a language preference in operation 102. A user may select a language preference at any time for use with a VUT, and such language preference selection does not have to be performed during an initial registration process. For example, the language preference may entered by the user during initiation of the VUT process or before a particular word is translated.

Figure 2:
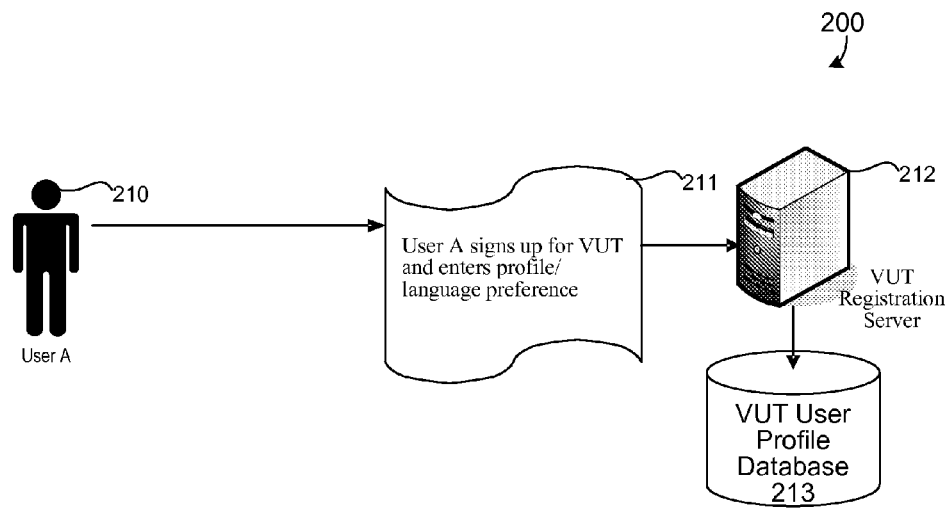
FIG. 2 is a diagrammatic representation of the set up of a virtual universal translator (VUT) via a registration process in accordance with one embodiment of the present invention.

In the illustrated embodiment, the user registers for the VUT service although such registration service is not required in other embodiments. FIG. 2 is a diagrammatic representation of the set up of a virtual universal translator (VUT) via a registration process 200 in accordance with one embodiment of the present invention. As shown, User A (210) registers for the VUT service and sets up her user profile and a language preference 211 via VUT registration server 212.

A language preference indicates to which language the user wishes the VUT to translate text that is seen by User A's mobile device camera. By way of example, User A may register at a VUT web site and enter user information, such as a username and password, and a language preference. The user may select a single language or multiple languages as a language preference. The user may also select an order of priority for multiple languages as a language preference.

After receiving a user's language preference, the VUT registration server 212 may then register User A in one or more user profile database 213. This action records the user's language preference for later use by the VUT as described further below.

Figure 3:
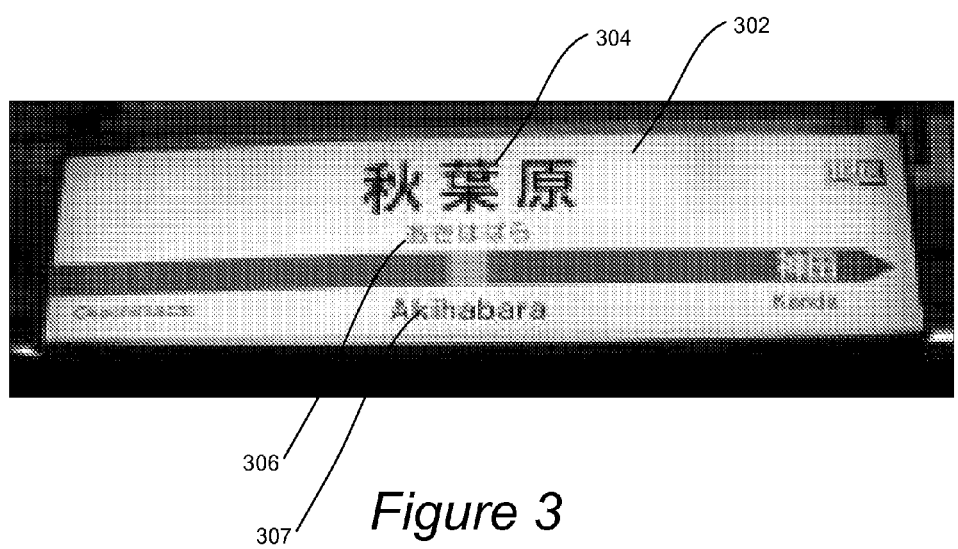
FIG. 3 is an example of a sign having Japanese text string which the user may encounter while traveling in Japan and may wish to translate from Japanese into English, by way of example.

Referring back to FIG. 1, it may be determined whether a translation option has been selected in operation 104. A VUT process may be triggered in any number of ways. In one embodiment, a user may initially encounter a foreign language sign. FIG. 3 is an example of a sign 302 having Japanese text string that the user encounters while traveling in Japan and may wish to translate from Japanese into English, by way of example. More specifically, the user sees a train station sign 302 containing Japanese words and/or phrases, e.g., 304 and 306. This sign 302 contains two Japanese text strings in different character sets: (i) a Japanese Kanji text string 304 and (ii) a Hiragana (Simplified Japanese) character text string 306. The sign also includes the English rendition of "Akihabara." The user may wish to translate either or both of these versions of the Japanese text strings (or the English rendition) although the different types of adjacent Japanese characters may typically represent the same thing or place. The VUT may be capable of translating both or either of these two text strings. A user may also select which character set of a multiple character set language is to be translated, and the VUT then only translates the chosen character set.

Figure 5A:
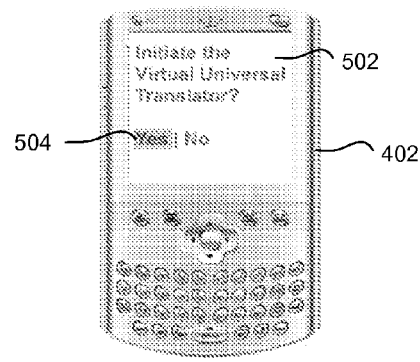
FIG. 5A shows a mobile device in the form of a PDA upon which a VUT option 502 is displayed.

After the user encounters a visual text string that she wishes to have translated by the VUT, the user may choose to turn on the VUT mobile application on her mobile device. The VUT option may be automatically presented to the user in the display of the mobile device after the user turns the mobile device on or after the user is viewing an image/video in the mobile devices camera. The user can also select the VUT option at any time as a selectable mobile application. FIG. 5A shows a mobile device 402 in the form of a PDA upon which a VUT option 502 is displayed. A user may select the VUT option, for example, by hitting a "yes" button 504, which indicates that the user has selected the translation or VUT option. A user may also select a language preference at this point and/or chose a preferred character set from a multiple character set language (e.g., Japanese).

In FIG. 1, the VUT process 100 may continue to wait for a translation option selection in operation 104. When a translation option has been selected, it may then be determined whether the camera is pointed at text in operation 106. As described further below, images/video from the camera may be processed for text strings. If an image/video contains only objects and not text, it may be determined that the camera is not pointed at text. However, if the image/video is processed and text is extracted from such image/video and recognized as text in a particular language, it may be determined that the camera is pointed at text. If the camera is not pointed at text, the procedure 100 may again determine whether the translation option is still selected. For instance, the user may have turned off the translation function on her mobile device to take a normal photograph or utilize some other mobile application, besides the VUT application.

When the translation option has been selected on the mobile device and the camera of the mobile device is pointed at text, the text at which the camera is pointed may be translated in operation 108. The translated text is then transposed over the text at which the camera is pointed in operation 110. That is, the translated text is transposed over the image/video that is being received by the camera and displayed on the display of the camera so that the translated text overlays the camera image/video in the display.

Figure 5B:
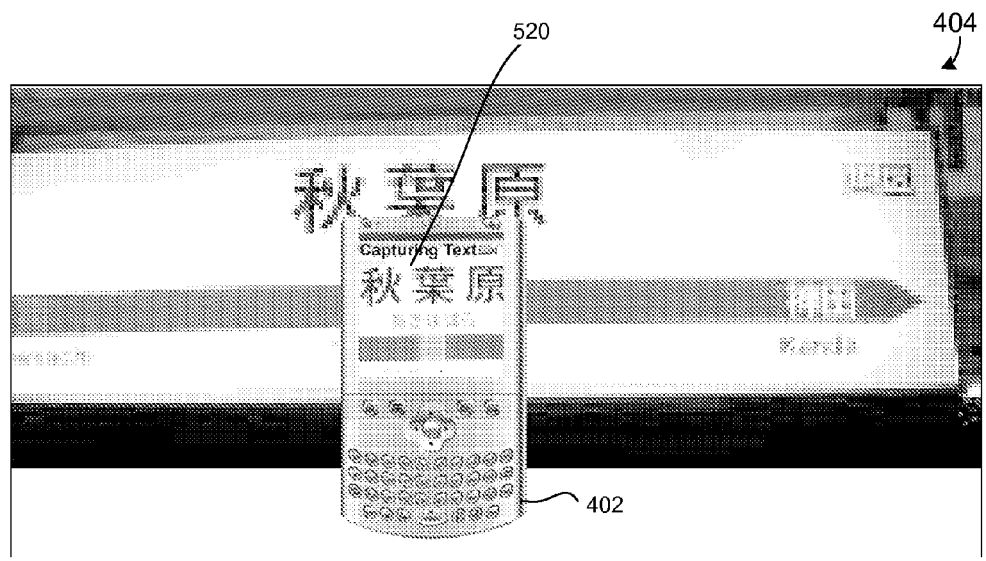
FIG. 5B illustrates a user passing mobile device over text to be translated in a sign by pointing the camera of the device directly at the text of such sign.
Figure 5C:
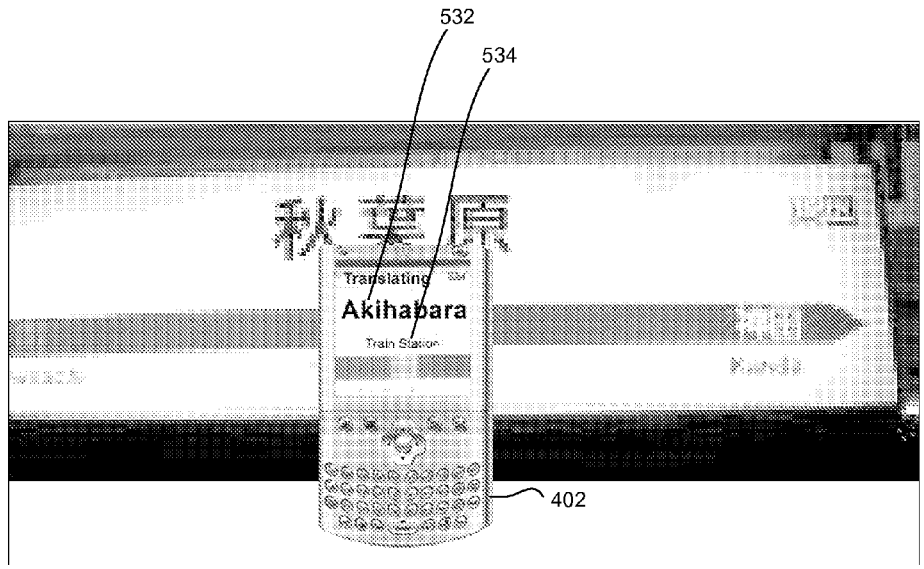
FIG. 5C illustrates translation results that are presented on a mobile device's display in accordance with one implementation of the present invention.

FIG. 5B illustrates a user passing mobile device 402 over text to be translated in a sign 404 by pointing the camera of the device directly at the text of such sign 302. The mobile device 402 receives a visual image/video 520 of the text as the user passes the camera over the text. FIG. 5C illustrates translation results that are presented on a mobile device's display in accordance with one implementation of the present invention. As shown, the mobile device 402 now contains the translation results "train station" 534, which is the English translation of the Japanese word (in English rendition) "Akihabara" 532. In specific embodiments, the translation results "train station" 534 are transposed over the image/video that is currently being captured by the camera. In a specific example, the translated text is superimposed in about the same position as the original text that was translated.

The translated text at which the camera is pointed may also be positioned or transposed over the image/video being captured by the camera so that it can be clear to the user which text is being translated. In FIG. 5C, the translated text "akihabara" 532 is positioned in the top of the image, while the translation result "train station" 534 is positioned underneath such translated text 532. The translated text and the corresponding translation result may be positioned with respect to each other in any suitable manner, e.g., alongside each other or by first displaying the translated text and then replacing it with the translation results.

As the user passes the camera over a page or a sign, the VUT can operate so that the mobile device continuously refreshes the image/video with text translated from the image/video so that the translated text is positioned over the displayed image/video nearby or over the translated text. For example, the VUT procedure 100 may be repeated for each text at which the camera is pointed. In a specific use although there are many, one could conceivably be given a menu in Japanese and pass his mobile device over the menu. As the mobile device is passed over the text on the menu, the Japanese text that is being passed over with the mobile device appears in English on the display of the mobile device.

Figure 5D:
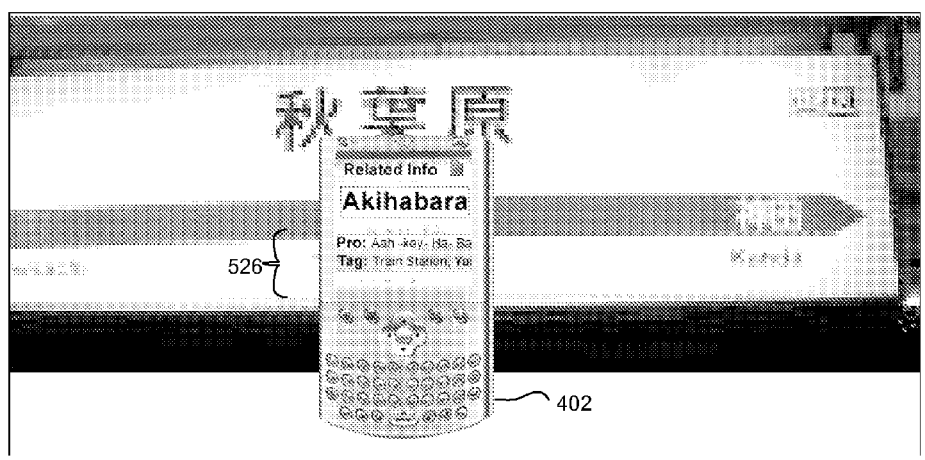
FIG. 5D illustrates contextual information that may be displayed with respect to the translated text in accordance with a specific implementation.

Contextual information may also be optionally provided for the translated text in operation 112. FIG. 5D illustrates contextual information 526 that may be displayed with respect to the translated text. In this example, a pronunciation 526 of the translated text "Akihabara" is provided In other embodiments, the pronunciation is also automatically output from an audio device (e.g., headphones or speakers) coupled with (by wire or wirelessly, e.g., via a Bluetooth wireless application) the mobile device. This audio feature may be used by the hearing impaired so that the translated text is audibly played in the user's native language without displaying the translated text.

If the translated text is determined to be a proper name, such as a specific place, other contextual information for the specific place may be provided for such specific place. Alternatively, the specific location for the translated text (e.g., train station) may be determined from the mobile device's GPS (global positioning satellite) device if present. In one example, if the translated text includes a specific train station name or a specific location can be determined from the mobile device's GPS and translated text, the provided contextual information may include a schedule, historical information, or directions for the specific train station, nearby stores or other businesses or government or public buildings, etc. In other examples, coupons or advertisements corresponding to the location or nearby locations may be presented to the user. Any number and type of contextual information may be provided with respect to the translated text or location of such translated text.

Figure 4:
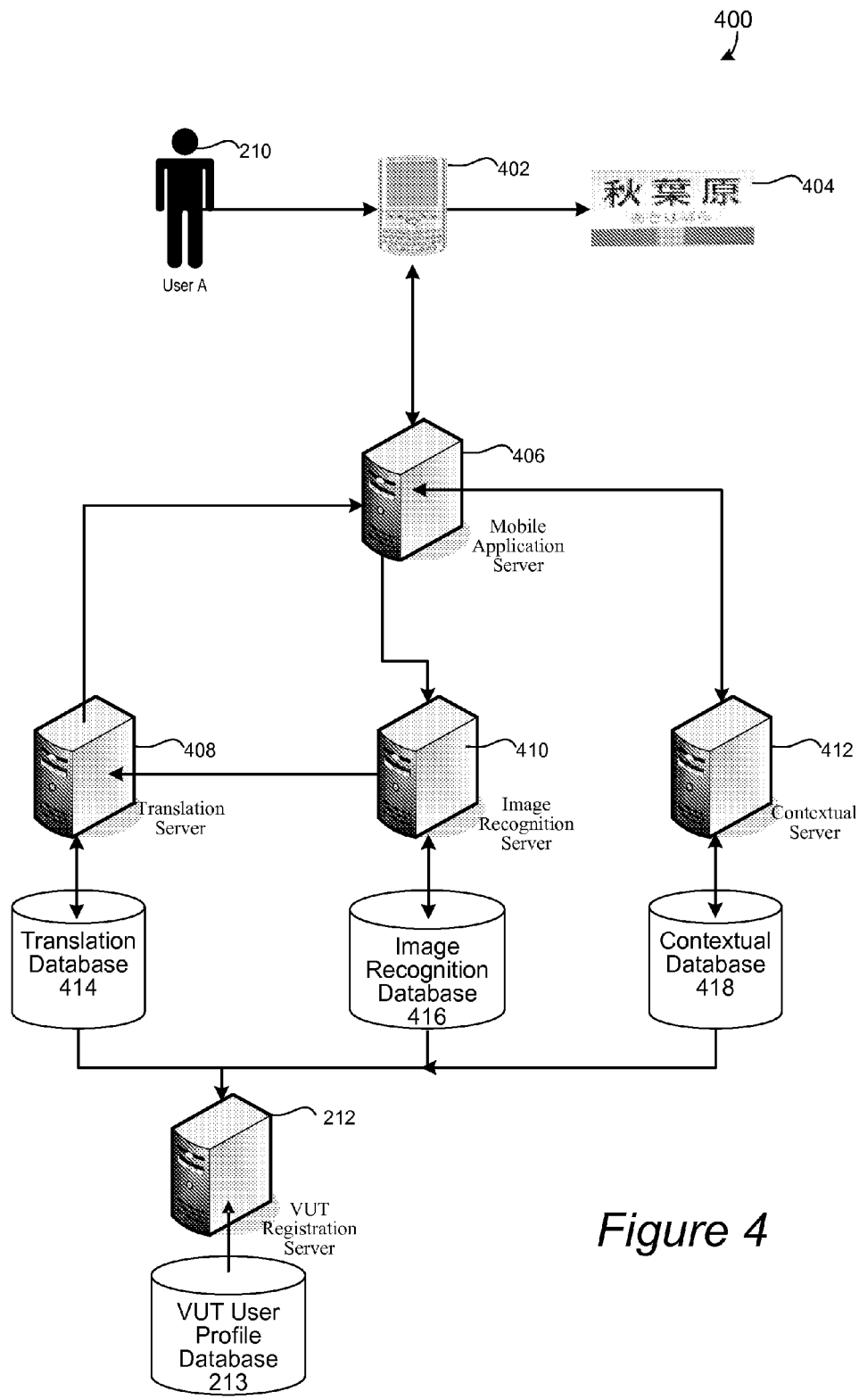
FIG. 4 is a diagrammatic representation of an example network for performing VUT for a specific User A of a specific mobile device in accordance with a specific implementation of the present invention.

A VUT application and/or service may be implemented for a specific mobile device user in any number of ways. FIG. 4 is a diagrammatic representation of an example network 400 for performing VUT for the specific User A (310) of mobile device 402 in accordance with a specific implementation of the present invention. User A (210) passes the camera of the mobile device 402, while running the mobile device's VUT application, over sign 404 having text that is to be translated. The camera captures an image/video of the sign 404. The mobile device 402 may send the image/video of the sign 404 to a mobile application server 406 to be processed.

The mobile application server 406 may also send the captured image/video to the image recognition server 410. The image recognition server 410 may be generally configured to perform optical character recognition of the captured image/video in order to determine the text on the received image, e.g., 404. In this specific example, the Japanese sign may include Kanji, Katakana, Hiragana, and/or Roman characters. Likewise, other foreign languages may each utilize one or more character sets. The data may also be captured in the image recognition database 416, and this recorded data may be used for later object recognition of a similar image/video and/or so as to be accessible by the user A (310).

Some techniques that may be used in image processing and object recognition analysis include but are not limited to: 1) generating a histogram that counts and graphs the total number of pixels at each grayscale level (A histogram may be used to detect underexposure or saturation in an image), 2) generating a line profile that plots the variations of intensity along a line (line profiles are sometime helpful in determining the boundaries between objects in an image), 3) performing intensity measurements to measure grayscale statistics in an image/video or a region of an image, such as but not limited to minimum intensity value, maximum intensity value, mean intensity value, standard deviation of the intensity value, 4) using look-up tables to convert grayscale values in the source image/video into other grayscale values in a transformed image, 5) using spatial filters to remove noise, smooth, sharpen or otherwise transform an image, such as but not limited to Gaussian filters for smoothing images/video, Laplacian filters for highlighting image/video detail, Median and nth order filters for noise removal and Prewitt, Roberts and Sobel filters for edge detection, 6) using grayscale morphology to filter or smooth the pixel intensities of an image, to alter the shape of regions by expanding bright areas at the expense of dark areas, remove or enhance isolated features, smooth gradually varying patterns and increase the contrast in boundary areas, 7) using frequency domain processing to remove unwanted frequency information, such as noise, 8) blob (binary large object) analysis in regards to touching pixels with same logic state (Blob analysis may be used to find statistical information such as the size of blobs or the number, location and presence of blob regions to locate particular objects in an image), 9) using thresholding to select ranges of pixel values in grayscale and color images/video that separate objects under consideration from the background, or 10) using binary morphological operations to extract and/or alter the structures of particles (e.g., blobs) in a binary image/video including primary binary morphology, advanced binary morphology.

Other techniques may include 11) using edge detection algorithms, 12) using gauging of dimensional characteristics of objects, 13) using image correlation to determine how close an image/video is to an expected image/video (e.g., comparing a newly captured image/video to a recorded image/video that has already been analyzed for text recognition), 14) using pattern matching to locate regions of a grayscale image/video and determine how close the grayscale image/video matches a predetermined template (Pattern matching may be configured to find template matches regardless of poor lighting, blur, noise, shifting of the template or rotation of the template. For graphical components on a captured image, the size, shape, location, etc. that correspond to specific text in an image/video may be predetermined which allows a template to be constructed for particular character sets), and 15) using optical character recognition algorithms and methods.

Text information that is extracted by the image recognition server 410 may also be sent to the translation server 408. The translation server 408 may be configured to match the words, phrases, sentences, etc. with the target language words, phrases, and sentences, etc, e.g., from translation database 414. The translation server 408 may also be configured to perform searches, such as a World Wide Web search to obtain translation information regarding a specific text string, and any found translation information may then be stored in translation database 414. Data may also be added into the translation database 414, and this recorded data may be used for later translation of a similar image/video and/or so as to be accessible by the user A (310). The translation server may then send the text back to the mobile application server 406, which sends the translated text to the user A's mobile device 402. The translated text may be overlaid over the pre-existing image/video of the sign or text behind the mobile devices display.

The translation process (e.g., on translation server 408) may have knowledge of the second language to which the text is to be translated based on the user's language preference. The translation process (e.g., on translation server 408) may also have knowledge of the originating language of the text that is to be translated based on a user's selection. That is, a user may enter the originating and the translation language, e.g., during a registration process with the VUT registration server 312 or during operation of the VUT process, and the language indications are stored in VUT user profile database 313 for later retrieval by the translation server 408.

In an alternative embodiment, the translation process (e.g., on translation server 408) may not have knowledge of the language of the text to be translated. In this situation, the translation process (e.g., on translation server 408) may be configured to automatically determine the language of the text to be translated without user input prior to obtaining the translation. The language of the text to be translated may be determined utilizing any of the image processing and/or object recognition techniques described herein.

Translation may include translating a first language to a second language, such as from English to French. In other embodiments, the translation may include translating from a first cultural, social, or political dialect to a second dialect. A dialect may be specific to a geographical region, political view (liberal vs. conservative), educational level (e.g., first grade vs. $12^{th}$ grade reading level), cultural group (e.g., urban NY city slang vs. urban LA slang). In a political example, words or phrases can be categorized as either liberal or conservative and translated from one category to the other and visa versa. In an educational example, words are phrases can be defined at specific reading levels and associated with other words and phrases that are at different specific reading levels. These education reading level associations can then be used to translate such words and phrases between different reading levels. A more intelligent translation process would include extracting an abstract concept from each phrase and then translating the abstract concept back into another dialect for the more concrete and less abstract phrase.

Translation may also include filtering of profanity or any other types of undesired words (e.g., as chose by the registering user). For example, a parent may choose to register their child's mobile VUT application to filter all profanity from translated text. In one implementation, filtered words or phrases are left out of the translated text displayed or audibly played on the mobile device. Any number and type of the different translation features described herein may be combined together. For instance, the VUT can translate from one language to another while lowering the reading level and filtering profanity.

The translated text may also be sent to a contextual server 412. GPS data from the mobile device may also be sent to the contextual server 412, e.g., via the mobile application server 406. The contextual server 412 may be configured to serve information back to the mobile application server that is found in a contextual database 418 regarding the translated text and/or GPS data. The contextual server 412 may also be configured to perform searches, such as a World Wide Web search to obtain contextual information regarding a translated text and/or location, and any found contextual information may then be stored in database 418. The mobile application server may then send the contextual information to the mobile device 210 for displaying on the display of the mobile device.

Embodiments for implementing and managing a VUT may be employed in a wide variety of diverse computing contexts. For example, as illustrated in FIG. 5, implementations are contemplated in which the relevant population of users interact with a diverse network environment via any type of computer (e.g., desktop, laptop, tablet, etc.) 502, media computing platforms 503 (e.g., cable and satellite set top boxes and digital video recorders), handheld computing devices (e.g., PDAs) 504, cell phones 406, or any other type of computing or communication platform.

And according to various embodiments, images/video and text (to be translated) that are processed in accordance with the invention may be obtained using a wide variety of techniques. For example, associations representing a user's interaction with a local application, web site or web-based application or service (e.g., associations between a user and language preferences) may be accomplished using any of a variety of well known mechanisms for recording a user's behavior. However, it should be understood that such methods of obtaining images/video are merely exemplary and that images/video may be collected in many other ways.

VUT management may be handled according to the invention in some centralized manner. This is represented in FIG. 5 by server 508 and data store 510 that, as will be understood, may correspond to multiple distributed devices and data stores (e.g., as shown in FIG. 4). The invention may also be practiced in a wide variety of network environments (represented by network 512) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Figure 6:
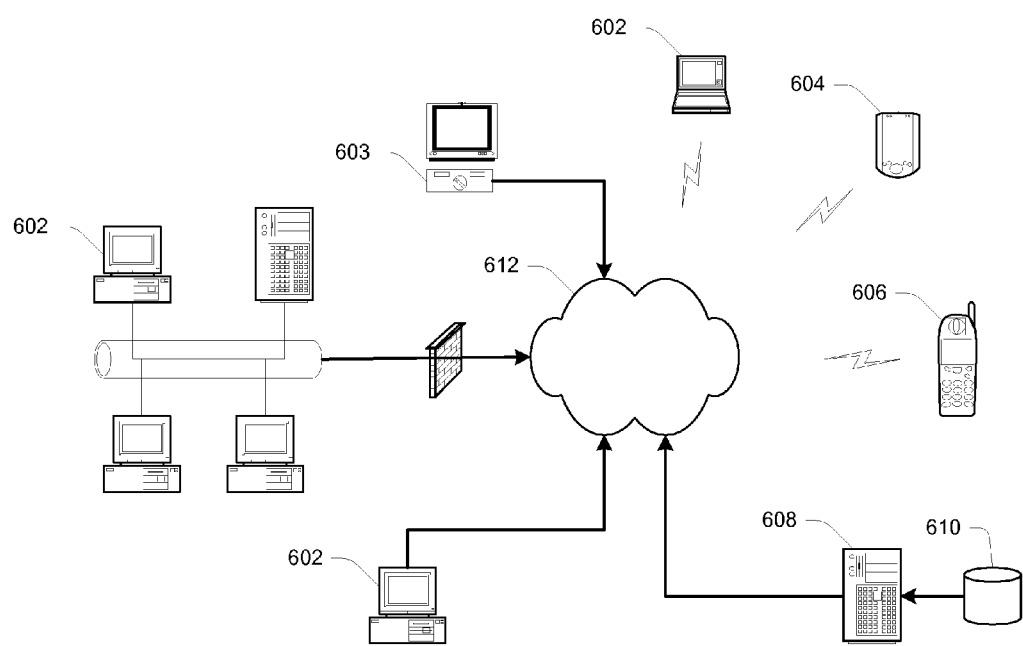
FIG. 6 is a simplified diagram of a network environment in which specific embodiments of the present invention may be implemented.
Figure 7:
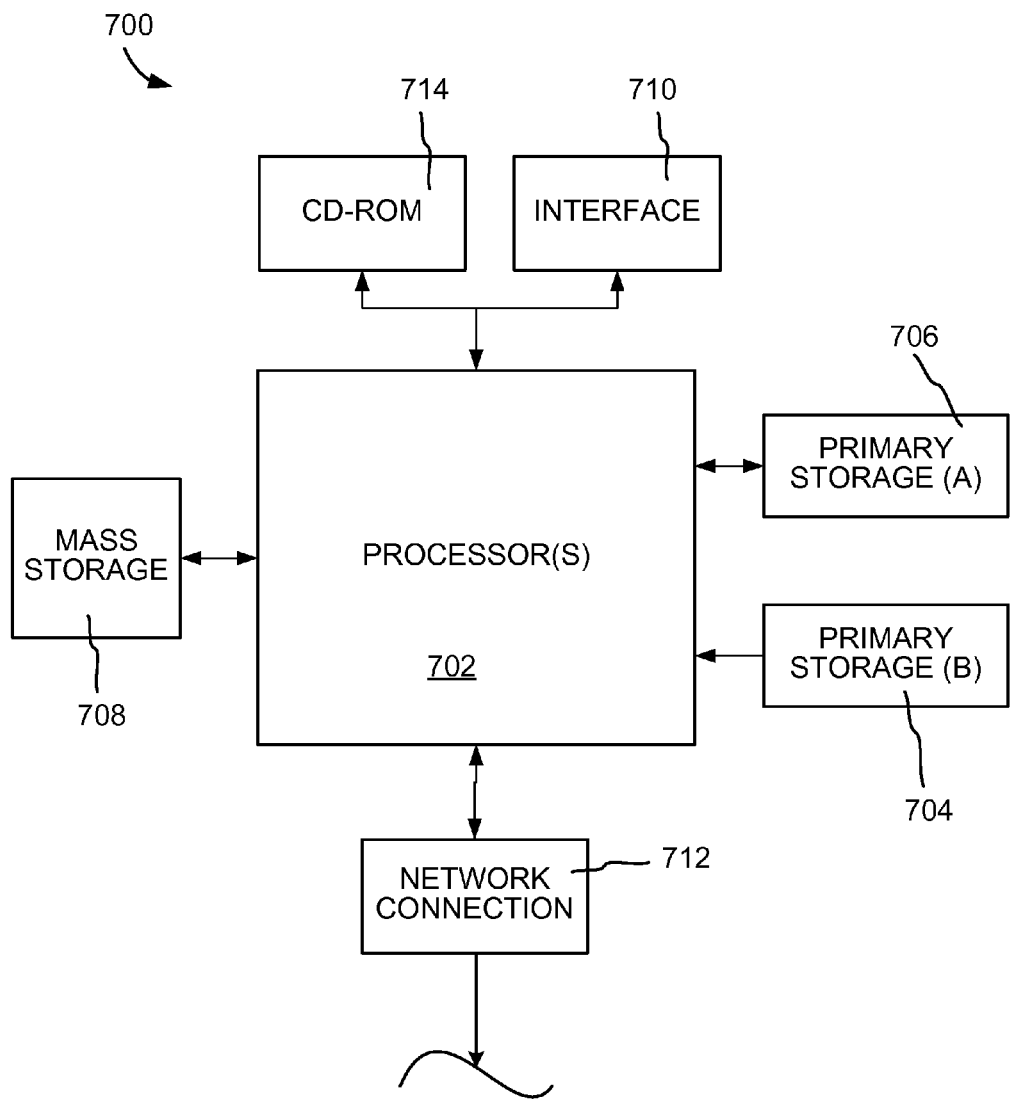
FIG. 7 illustrates a typical computer system that, when appropriately configured or designed, can serve as a system of this invention.

FIG. 6 illustrates a typical computer system that, when appropriately configured or designed, can serve as a VUT application or system of this invention. The computer system 600 includes any number of processors 602 (also referred to as central processing units, or CPUs) that are coupled to storage devices including primary storage 606 (typically a random access memory, or RAM), primary storage 604 (typically a read only memory, or ROM). CPU 602 may be of various types including microcontrollers and microprocessors such as programmable devices (e.g., CPLDs and FPGAs) and unprogrammable devices such as gate array ASICs or general purpose microprocessors. As is well known in the art, primary storage 604 acts to transfer data and instructions uni-directionally to the CPU and primary storage 606 is used typically to transfer data and instructions in a bi-directional manner. Both of these primary storage devices may include any suitable computer-readable media such as those described herein. A mass storage device 608 is also coupled bi-directionally to CPU 602 and provides additional data storage capacity and may include any of the computer-readable media described above. Mass storage device 608 may be used to store programs, data and the like and is typically a secondary storage medium such as a hard disk. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 is also coupled to an interface 610 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to an external device such as a database or a computer or telecommunications network using an external connection as shown generally at 612. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store images/video, text to be translated, translation results, contextual information, user profile and preferences, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as air, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method of translating text using a mobile device, comprising:
   in response to an image/video being obtained by a camera of the mobile device, displaying the obtained image/video in a display of the mobile device;
   in response to an image/video being obtained by the camera of the mobile device and a translation option being selected on the mobile device, sending the image/video from the mobile device to an image recognition server for processing the image/video to determine whether the image/video contains a first text string in a first language;
   in response to receiving from the image recognition server a determination that the image/video contains the first text string in the first language, sending the first text string to a translation server for obtaining a translation of the first text string into a second text string in a second language that has been associated with a user of the mobile device or the mobile device;
   after the translation of the first text string into the second text string in the second language is obtained, displaying in the display of the mobile device the second text string in the second language transposed over the first text string in the image/video captured by the camera; and
   as the camera continuously obtains a new image/video, repeating displaying the new image/video, determining whether the new image/video contains a new text string, obtaining a translation for the new text string, and displaying the translation of the new text string transposed over the new text string in the new image/video.

2. A method as recited in claim 1, further comprising:
   obtaining contextual information associated with the first or second text string; and
   displaying, in the display of the mobile device, the obtained contextual information.

3. A method as recited in claim 1, wherein the user has registered with the translation server to have the second language associated with such user and the mobile device.

4. A method as recites in claim 1, wherein the second text string is positioned near the first text string.

5. A method as recites in claim 1, wherein the first language is a first reading level and the second language is a second reading level differing from the first reading level.

6. A method as recited claim 1, wherein the image/video is processed for multiple first text strings, which are translated into multiple second text strings, each second text string being positioned near its corresponding first text string.

7. A mobile device for translating text, comprising:
a camera for capturing images/video;
a display for displaying the captured images/video;
at least one processor; and
at least one memory, the at least one processor and/or memory being configured for:
in response to an image/video being obtained by a camera of the mobile device, displaying the obtained image/video in a display of the mobile device;
in response to an image/video being obtained by the camera of the mobile device and a translation option being selected on the mobile device, sending the image/video from the mobile device to an image recognition server for processing the image/video to determine whether the image/video contains a first text string in a first language;
in response to receiving from the image recognition server a determination that the image/video contains the first text string in the first language, sending the first text string to a translation server for obtaining a translation of the first text string into a second text string in a second language that has been associated with a user of the mobile device or the mobile device;
after the translation of the first text string into the second text string in the second language is obtained, displaying in the display of the mobile device the second text string in the second language transposed over the first text string in the image/video captured by the camera; and
as the camera continuously obtains a new image/video, repeating displaying the new image/video, determining whether the new image/video contains a new text string, obtaining a translation for the new text string, and displaying the translation of the new text string transposed over the new text string in the new image/video.

8. A mobile device as recited in claim 7, the at least one processor and/or memory being further configured for:
determining contextual information associated with the first or second text string; and
displaying, in the display of the mobile device, the determined contextual information.

9. A mobile device as recited in claim 7, wherein the user has registered with the translation server to have the second language associated with such user and the mobile device.

10. A mobile device as recites in claim 7, wherein the second text string is positioned near the first text string.

11. A mobile device as recites in claim 7, wherein the first language is a first reading level and the second language is a second reading level differing from the first reading level.

12. A mobile device as recited claim 7, wherein the image/video is processed for multiple first text strings, which are translated into multiple second text strings, each second text string being positioned near its corresponding first text string.

13. At least one non-transitory computer readable storage medium having computer program instructions stored thereon that are arranged to perform the following operations:
in response to an image/video being obtained by a camera of the mobile device, displaying the obtained image/video in a display of the mobile device;
in response to an image/video being obtained by the camera of the mobile device and a translation option being selected on the mobile device, sending the image/video from the mobile device to an image recognition server for processing the image/video to determine whether the image/video contains a first text string in a first language;
in response to receiving from the image recognition server a determination that the image/video contains the first text string in the first language, sending the first text string to a translation server for obtaining a translation of the first text string into a second text string in a second language that has been associated with a user of the mobile device or the mobile device;
after the translation of the first text string into the second text string in the second language is obtained, displaying in the display of the mobile device the second text string in the second language transposed over the first text string in the image/video captured by the camera; and
as the camera continuously obtains a new image/video, repeating displaying the new image/video, determining whether the new image/video contains a new text string, obtaining a translation for the new text string, and displaying the translation of the new text string transposed over the new text string in the new image/video.

14. At least one computer readable storage medium as recited in claim 13, further comprising:
obtaining contextual information associated with the first or second text string; and
displaying, in the display of the mobile device, the obtained contextual information.

15. At least one computer readable storage medium as recited in claim 13, wherein the user has registered with the translation server to have the second language associated with such user and the mobile device.

16. At least one computer readable storage medium as recites in claim 13, wherein the second text string is positioned near the first text string.

17. At least one computer readable storage medium as recites in claim 13, wherein the first language is a first reading level and the second language is a second reading level differing from the first reading level.

18. At least one computer readable storage medium as recited claim 13, wherein the image/video is processed for multiple first text strings, which are translated into multiple second text strings, each second text string being positioned near its corresponding first text string.

19. A method as recited in claim 1, wherein selection of the translation option includes selection of the second language and selection of a particular character set from a plurality of character sets for such second language, wherein the second text string is formed from the particular character set.

20. A mobile device as recited in claim 7, wherein selection of the translation option includes selection of the second language and selection of a particular character set from a plurality of character sets for such second language, wherein the second text string is formed from the particular character set.

21. At least one computer readable storage medium as recited in claim 13, wherein selection of the translation option includes selection of the second language and selection of a particular character set from a plurality of character sets for such second language, wherein the second text string is formed from the particular character set.

* * * * *